United States Patent
Matsumoto et al.

(10) Patent No.: US 6,752,011 B2
(45) Date of Patent: Jun. 22, 2004

(54) THERMOSTAT FAILURE DIAGNOSIS APPARATUS FOR INTERNAL COMBUSTION ENGINE

(75) Inventors: Takuya Matsumoto, Aichi (JP); Yoshiaki Higuchi, Irvine, CA (US); Tateo Kume, Aichi (JP); Hidetsugu Kanao, Aichi (JP); Tomonobu Sakagami, Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/350,106

(22) Filed: Jan. 24, 2003

(65) Prior Publication Data

US 2003/0110848 A1 Jun. 19, 2003

Related U.S. Application Data

(62) Division of application No. 09/570,540, filed on May 12, 2000, now Pat. No. 6,532,808.

(30) Foreign Application Priority Data

May 12, 1999 (JP) .......................................... 11-131232

(51) Int. Cl.[7] .............................................. G01M 15/00
(52) U.S. Cl. .................................... 73/119 R; 73/118.1
(58) Field of Search ............................... 73/116, 117.2, 73/117.3, 118.1, 119 R

(56) References Cited

U.S. PATENT DOCUMENTS

| | | | |
|---|---|---|---|
| 6,200,021 B1 * | 3/2001 | Mitsutani et al. .............. 374/1 |
| 6,279,390 B1 * | 8/2001 | Oka et al. .................. 73/118.1 |
| 6,283,381 B1 * | 9/2001 | Uchiyama .................... 236/94 |
| 6,386,022 B1 * | 5/2002 | Oka et al. .................. 73/118.1 |
| 6,532,808 B1 * | 3/2003 | Matsumoto et al. ....... 73/119 R |
| 6,679,110 B2 * | 1/2004 | Oka et al. .................. 73/118.1 |
| 2003/0131659 A1 * | 7/2003 | Oka et al. .................. 73/118.1 |

FOREIGN PATENT DOCUMENTS

JP          10-184433 A          7/1998

* cited by examiner

*Primary Examiner*—Eric S. McCall
(74) *Attorney, Agent, or Firm*—Birch, Stewart, Kolasch & Birch, LLP

(57) ABSTRACT

In a thermostat failure diagnosis apparatus for an internal combustion engine in which a failure diagnosis of a thermostat can be effectively made, in the case where, after starting of the engine, an intake air quantity of the engine or a parameter related to the intake air quantity is equal to or higher than a predetermined value, and a cooling water temperature is equal to or higher than an intake air temperature (outside air temperature), on the basis of a time in which a rising quantity in the cooling water temperature at an upstream side of the thermostat reaches a predetermined value, or a time in which the cooling water temperature rises to a predetermined temperature, the failure of the thermostat is judged. By this, the failure diagnosis of the thermostat can be rationally made only when the engine generating heat quantity is large to some degree to prevent erroneous diagnosis.

6 Claims, 4 Drawing Sheets

THERMOSTAT FAILURE DIAGNOSIS APPARATUS FOR INTERNAL COMBUSTION ENGINE

RELATED APPLICATION

This nonprovisional application is a divisional of application Ser. No. 09/570,540, filed on May 12, 2000, now U.S. Pat. No. 6,532,808, the entire contents of which are hereby incorporated by reference and for which priority is claimed under 35 U.S.C. §120; and this application claims priority under 35 U.S.C. §119(a) on Patent Application No. 11-131232 filed in Japan on May 12, 1999.

BACKGROUND OF THE INVENTION

The present invention relates to a thermostat failure diagnosis apparatus for an internal combustion engine, which diagnoses presence of a thermostat for performing temperature adjustment of cooling water of the internal combustion engine.

DESCRIPTION OF RELATED ART

In an internal combustion engine mounted on an automobile (vehicle), for example, a radiation, of a water-cooled engine, having an introducing/discharging water passages is coupled to a water jacket formed inside of an engine body such that it surrounds a combustion chamber and a cylinder, and cooling water is made to circulate within the water jacket, so that heat of the engine is radiated to the air.

In such an engine, in order to always keep a cooling water temperature suitable, an automatic opening/closing thermostat for opening/closing of a cooling water passage in accordance with the cooling water temperature is provided at the cooling water passage of the engine, for example, at an outlet of the water jacket.

Since the thermostat generally adopts a structure to open/close a valve by a volume change of wax paraffin, it is excellent in durability, nevertheless it can break down.

Although a failure where the thermostat does not open but remains closed can be inferred from behavior that a needle of a water temperature meter in an instrument panel of an automobile abruptly rises, a failure where the thermostat does not close but remains opened is hard to recognize.

As a technique of diagnosing the failure of the thermostat where it remains opened, a technique of failure diagnosis of a thermostat is recently proposed in Japanese Patent Unexamined Publication No. H10-184433.

This failure diagnosis is a technique in which judgment is made on either one of an elapsed time in which a rising quantity in cooling water temperature at an engine side reaches a predetermined value after starting of an engine, or the cooling water temperature at the engine side reaches a predetermined temperature, the number of times of ignition, and an integrated value of quantity of heat generated from the engine, and the opening failure of the thermostat is diagnosed on the basis of the judgment value.

By the way, an automobile is used in various ways, for example, an idling operation is performed after starting of an engine, or made to run immediately after starting of an engine, and usually, the idling operation is often performed after starting of an engine.

However, in the failure diagnosis of the above publication, when the idling operation is performed after starting of an engine, there is a fear that such an erroneous diagnosis is made that the thermostat has broken down though it has not actually broken down.

That is, in the idling operation of an engine, as compared with the case where an automobile is running, since the quantity of generated heat of the engine is low, the greater part of the quantity of the generated heat is released into the air, the quantity of heat transmitted from the engine to cooling water becomes low, and it takes time for the temperature of the cooling water temperature to rise.

Thus, when the failure diagnosis disclosed in the above publication is carried out in the state where the idling is continued after starting of the engine, since the quantity of heat transmitted from the engine to the cooling water is low, even if either one of the elapsed time after starting of the engine, the number of times of ignition, and the engine generating heat quantity is integrated, an integrated value required for failure judgment can not be obtained, and it is apt to make an erroneous judgment that the thermostat has broken down though it is not normal. Particularly, such a state is apt to occur in a cold district or at a low outside air temperature since the greater part of the heat quantity is lost to keep the engine temperature and the heat quantity contributing to the rising of cooling water temperature becomes extremely low.

SUMMARY OF THE INVENTION

The present invention has been made in view of the foregoing circumstances, and an object thereof is to provide a thermostat failure diagnosis apparatus for an internal combustion engine, which can effectively conduct a failure diagnosis of a thermostat while an erroneous diagnosis is prevented.

In order to achieve the above object, a thermostat failure diagnosis apparatus of the present invention comprises cooling water temperature detection means for detecting a cooling water temperature of an internal combustion engine at an upstream side of a thermostat, detection means for detecting an intake air quantity of the internal combustion engine or a parameter related to the intake air quantity, and diagnosis means for detecting a failure of the thermostat on the basis of at least one of a time in which a rising quantity in the cooling water temperature reaches a predetermined value and a time in which the cooling water temperature rises to a predetermined temperature, in a case where a detection value detected by the detection means is equal to or higher than a predetermined value after starting of the internal combustion engine.

Alternatively, a thermostat failure diagnosis apparatus of the present invention comprises cooling water temperature detection means for detecting a cooling water temperature of an internal combustion engine at an upstream side of a thermostat, detection means for detecting a fuel injection quantity of the internal combustion engine or a parameter related to the fuel injection quantity, and diagnosis means for detecting a failure of the thermostat on the basis of at least one of a time in which a rising quantity in the cooling water temperature reaches a predetermined value and a time in which the cooling water temperature rises to a predetermined temperature, in a case where a detection value detected by the detection means is equal to or higher than a predetermined value after starting of the internal combustion engine.

In both cases, it is preferable that the failure diagnosis apparatus further comprises outside air temperature detection means for detecting an outside air temperature or a parameter related to the outside air temperature, and the diagnosis means permits failure diagnosis in a case where, after the starting of the engine, the cooling water temperature detected by the cooling water temperature detection means becomes equal to or higher than the outside air temperature detected by the outside air temperature detection means.

Besides, it is preferable that the diagnosis means conducts a failure diagnosis by comparing a predetermined time with at least one of the time in which the rising quantity in the cooling water temperature reaches the predetermined value and the time in which the cooling water temperature rises to the predetermined temperature, and the predetermined time is set based on the cooling water temperature detected by the cooling water temperature detection means.

According to such a failure diagnosis apparatus, when the generated heat quantity of the internal combustion engine is low so that an erroneous diagnosis may occur, the failure diagnosis is not made, and only in the state where the quantity of heat generated in the internal combustion engine is high to some degree, the failure diagnosis of the thermostat is made. Thus, the diagnosis having high reliability can be made while the occurrence of an erroneous diagnosis is suppressed.

Further, since a region where the failure diagnosis is made can be set in a region where the cooling water temperature easily rises, from the intake air quantity or the fuel injection quantity indicating considerably high correlation with output of the internal combustion engine, processing of the failure diagnosis can be effectively carried out, and a diagnosis time can also be made short.

DETAILED DESCRIPTION OF THE PREFERRED EMBODIMENTS

Hereinafter, the present invention will be described with reference to a first preferred embodiment shown in FIGS. 1 to 3.

Figure 1:
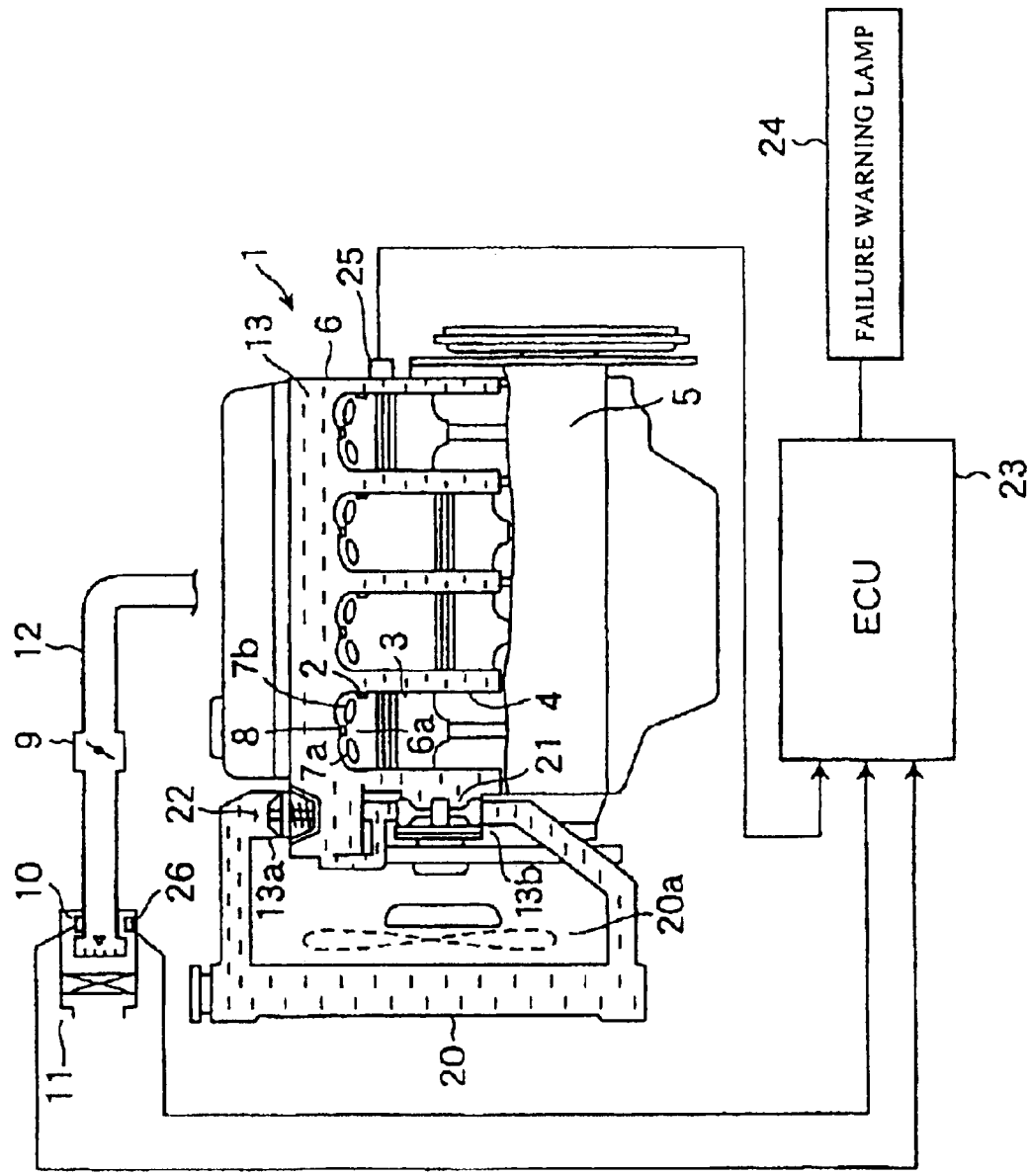
FIG. 1 is a view for explaining a thermostat failure diagnosis apparatus for an internal combustion engine according to a first embodiment of the invention.
Figure 2:
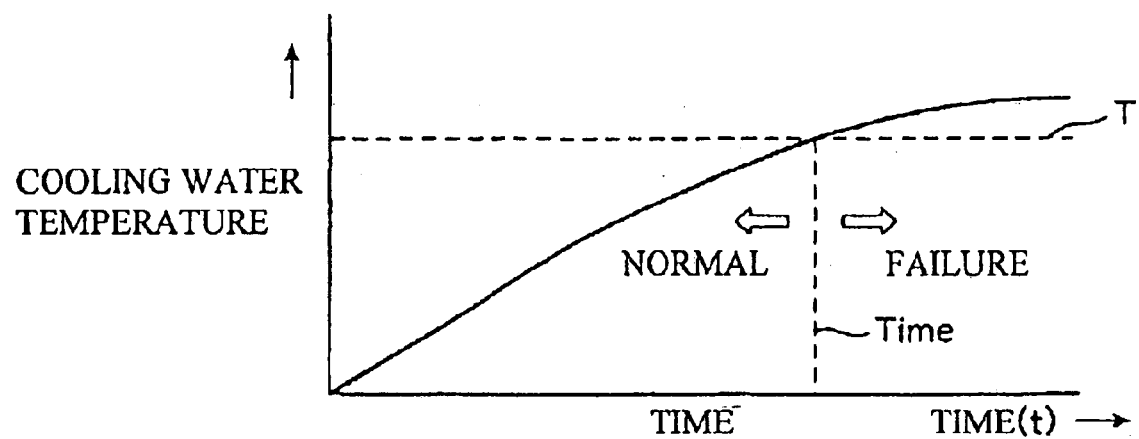
FIG. 2 is a diagram showing temperature rising of cooling water when a failure diagnosis of a thermostat is made by the diagnosis apparatus.

In FIG. 1, reference numeral 1 designates an internal combustion engine mounted on an automobile (vehicle), for example, a reciprocating engine (hereinafter simply referred to as an engine) in which fuel is injected from an injector 2 in accordance with an operation state of the automobile, and a radiator 20 is disposed at the front side of the engine 1 and includes an electric cooling fan 20a.

The main body of the engine 1 includes a cylinder block 5 having a plurality of cylinders 4, in each of which a piston 3 reciprocates, and a cylinder head 6 provided on a head of the cylinder block 5. The cylinder head 6 includes a combustion chamber 6a disposed at a head of each of the cylinders 4. The injector 2, intake/exhaust valves 7a and 7b, and an ignition plug 8 are assembled in each combustion chamber 6a, and by respective steps of intake, compression, fuel injection, ignition, explosion, and exhaustion performed in accordance with reciprocating movement of the piston 3, power is output to the outside through a connecting rod and a crank shaft (both are not shown). Incidentally, reference numeral 12 designates an intake passage which guides intake air to each intake port opened and closed by the intake valve 7a and which is provided with a throttle valve 9, an air flow sensor 10 (corresponding to detection means for detecting intake air), and an air cleaner 11 in sequence.

Inside of the cylinder block 5 and the cylinder head 6, a water jacket 13 (corresponding to a cooling water passage of the invention) is formed so as to surround the respective cylinders 4 and the respective combustion chambers 6a. The water jacket 13 has an outlet 13a at the front of the cylinder head 6 and has an inlet 13b at the front of the cylinder block 5, and its inside is filled with cooling water. The outlet 13a of the water jacket 13 is connected to an inlet of the radiator 20, and the inlet 13b of the water jacket 13 is connected to an outlet of the radiator 20. The cooling water heated by heat generation of the engine 1 is cooled by the radiator 20 and is again returned to the engine 1 (circulation). Reference numeral 21 designates an engine driven type water pump which forcibly circulates the cooling water and is fitted in the inlet 13b.

An automatic opening/closing thermostat 22 for opening/closing the outlet 13a in accordance with a cooling water temperature is attached to the outlet 13a of the water jacket 13. The thermostat 22 is constructed by combining wax paraffin that changes its volume according to temperature change of the cooling water and a valve for closing the outlet 13a when the cooling water temperature is low and for opening the outlet 13a when it is high, by the volume change of the wax paraffin (both are not shown). The cooling water at the side of the engine 1 does not flow into the radiator 20 until the cooling water temperature rises to a suitable temperature range, and when the cooling water temperature exceeds the temperature range, the cooling water is guided to the radiator 20.

The presence of a failure in the thermostat 22 is judged (diagnosed) by a thermostat failure diagnosis apparatus including, for example, an ECU 23 for engine control (which includes, for example, a microcomputer: corresponding to diagnosis means).

During a failure diagnosis, a control (method, device) for a diagnosis of whether the thermostat 22 is normal or not is used, on the basis of a time in which a rising quantity in the cooling water temperature at the engine side (upstream side) from the thermostat 22 reaches a predetermined value when, after starting of the engine 1, a parameter value related to an intake air quantity is equal to or higher than a predetermined value, that is, when the quantity of heat generated from the engine 1 is large to some degree so that there is no fear of an erroneous diagnosis.

Specifically, the ECU 23 is connected to the air flow sensor (AFS) 10 and a temperature sensor 25 (corresponding to cooling water temperature detection means) for detecting the cooling water temperature, which is fitted to the cylinder block 5. The water temperature sensor 25 is fitted to the water jacket portion at the upstream side from the thermostat 22. An AFS frequency of the air flow sensor 10, indicative of an amount of air flow, which becomes the parameter value related to the intake air quantity is input from the air flow sensor 10, and the cooling water temperature at the upstream side of the thermostat 22 is input from the water temperature sensor 25. The ECU 23 is provided with a function of measuring the AFS frequency after starting of the engine 1, function of judging whether the engine generating heat quantity is large to some degree based on the AFS frequency, function of judging whether rising of the cooling water temperature reaches a predetermined value, for example, an opening/closing switching temperature of the thermostat 22 in a judgment time which becomes a predetermined value, when the engine generating heat quantity is large to some degree, function of judging that the thermostat is normal when the cooling water temperature rises to the opening/ closing switching temperature within the judgment time and judging that it has broken down when the cooling water temperature does not rise within that time, and function of lighting notification means, for example, a failure warning lamp 24 connected to the ECU 23 when it is judged that the thermostat has broken down. Further, the ECU 23 is provided with a function of starting the failure diagnosis of the thermostat 22 when, after starting of the engine, the cooling water temperature becomes equal to or higher than an intake air temperature detected by an intake air temperature sensor 26 of the engine 1, which is related to an outside air temperature, so that the failure diagnosis is not made when the cooling water is in the state where its temperature is harder to raise than usual.

Figure 3:
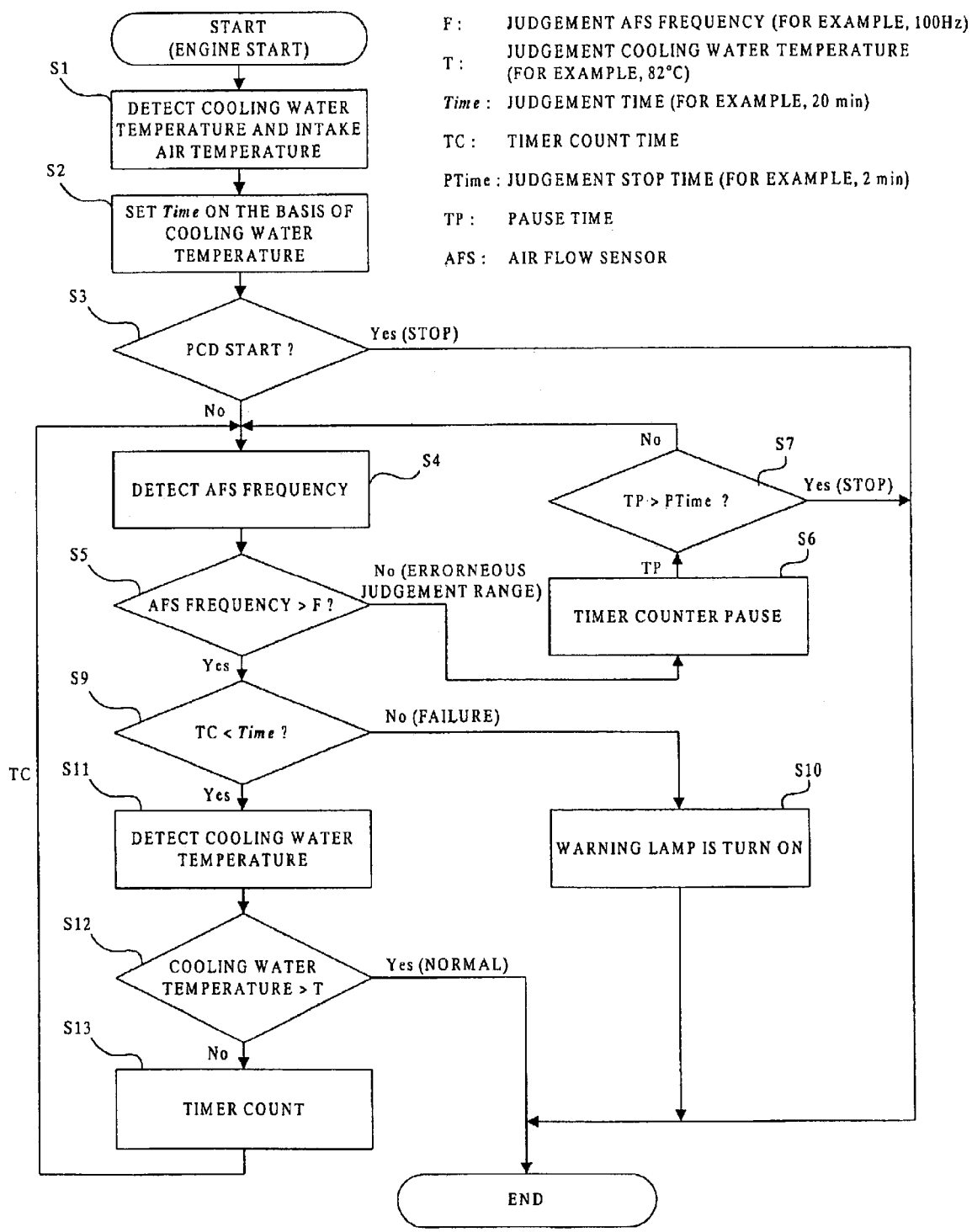
FIG. 3 is a flowchart showing the contents of the failure diagnosis in the diagnosis apparatus.

The control of this failure diagnosis is shown in the flowchart of FIG. 3.

The control of the failure diagnosis will be described with reference to the flowchart of FIG. 3. Now, it is assumed that the engine 1 is started.

The ECU 23 detects the present cooling water temperature of the engine 1 and the intake air temperature (corresponding to the outside air temperature) from the water temperature sensor 25 and the intake air temperature sensor 26 (step S1). Next, on the basis of the detected cooling water temperature, a judgment time Time (for example, 20 min) as a basis of failure judgment, in which the present cooling water temperature is expected to reach the opening/closing switching temperature of the thermostat 22, is set (step S2).

Subsequently, the ECU 23 proceeds to step S3, and it is judged whether the engine 1 is started from a cool state or from a warm state (PCD: Partial Cool-Down) on the basis of whether the cooling water temperature is almost equal to the intake air temperature. At this time, if the cooling water temperature is higher than the intake air temperature, it is judged that the engine is started from the PCD.

Here, in the case where starting is made in the PCD state, since the cooling water temperature is high, the judgment time is set shorter than usual. However, there is a case where the cooling water temperature does not rise to the opening/ closing switching temperature within the judgment time, since the outside air temperature is low so that the heat quantity used for rising of the cooling water temperature is released into the air, and an erroneous diagnosis may be caused. Then, at this time, the failure diagnosis of the thermostat 22 is stopped.

When the cooling water temperature is almost equal to the outside air temperature, the ECU 23 reads a signal 10 from the air flow sensor 10, that is, the AFS frequency (step S4). Next, as shown in step S5, the measured AFS frequency is compared with a judgment AFS frequency (for example, 100 Hz) F specifying an operation state in which the quantity of heat generated from the engine 1 is secured to some degree. At this time, when the measured AFS frequency is lower than the judgment AFS frequency F, the engine 1 is in an operation state where an erroneous diagnosis may occur, that is, the quantity of heat generated from the engine 1 is small and there is a fear that rising of the cooling water temperature becomes obscure, the processing proceeds from step S5 to step S6 and step S7. When the state (TP time) continues for a time exceeding a predetermined judgment stop time PTime, it is judged that there is a fear of an erroneous diagnosis, and the failure diagnosis of the thermostat 22 is stopped.

When the amount of heat generated by the engine 1 is large to some degree, regulation of timer count through the judgment time Time performed at next step S9, measurement of the cooling water temperature performed at step S11, regulation of the cooling water temperature through judgment cooling water temperature T (opening/closing switching temperature of the thermostat 22: for example, 82° C.) performed at step S12, timer count (TC) performed at step S13 are repeated. By this, as shown in FIG. 2, it is judged whether the cooling water temperature gradually rising with the elapse of time has risen to the judgment cooling water temperature T (opening/closing switching temperature of the thermostat 22) by the judgment time Time.

At this time, when the rising quantity in the cooling water temperature reaching the judgment cooling water temperature T is not seen within the judgment time Time, the ECU 23 judges that the thermostat 22 has broken, proceeds from step S9 to step S10, and lights the failure warning lamp 24 to notify a driver that the thermostat 22 has broken.

If the cooling water temperature reaches the judgment cooling water temperature T within the judgment time Time, it is judged that the thermostat 22 is normal.

As described above, in this failure diagnosis, when the engine generating heat quantity is small, so that there is a fear of erroneous diagnosis, the failure judgment is not made, and the failure judgment is made only in the state where the engine generating heat quantity is large to some degree. Thus, the failure diagnosis of the thermostat 22 having high reliability can be made while the occurrence of erroneous diagnosis is suppressed.

Further, the region where the failure diagnosis is made can be set in the region where the cooling water temperature is easily raised, on the basis of the intake air quantity indicating considerably high correlation with the output of the engine 1, and the processing of the failure diagnosis can be effectively made, so that a diagnosis time can be made short.

Moreover, since the failure of the thermostat 22 is diagnosed only when, the engine 1 is started from the cool state, the failure judgment in the state where the cooling water is heated and there is a fear of erroneous diagnosis, can be avoided, and the failure diagnosis of the thermostat 22 having higher reliability can be made.

Figure 4:
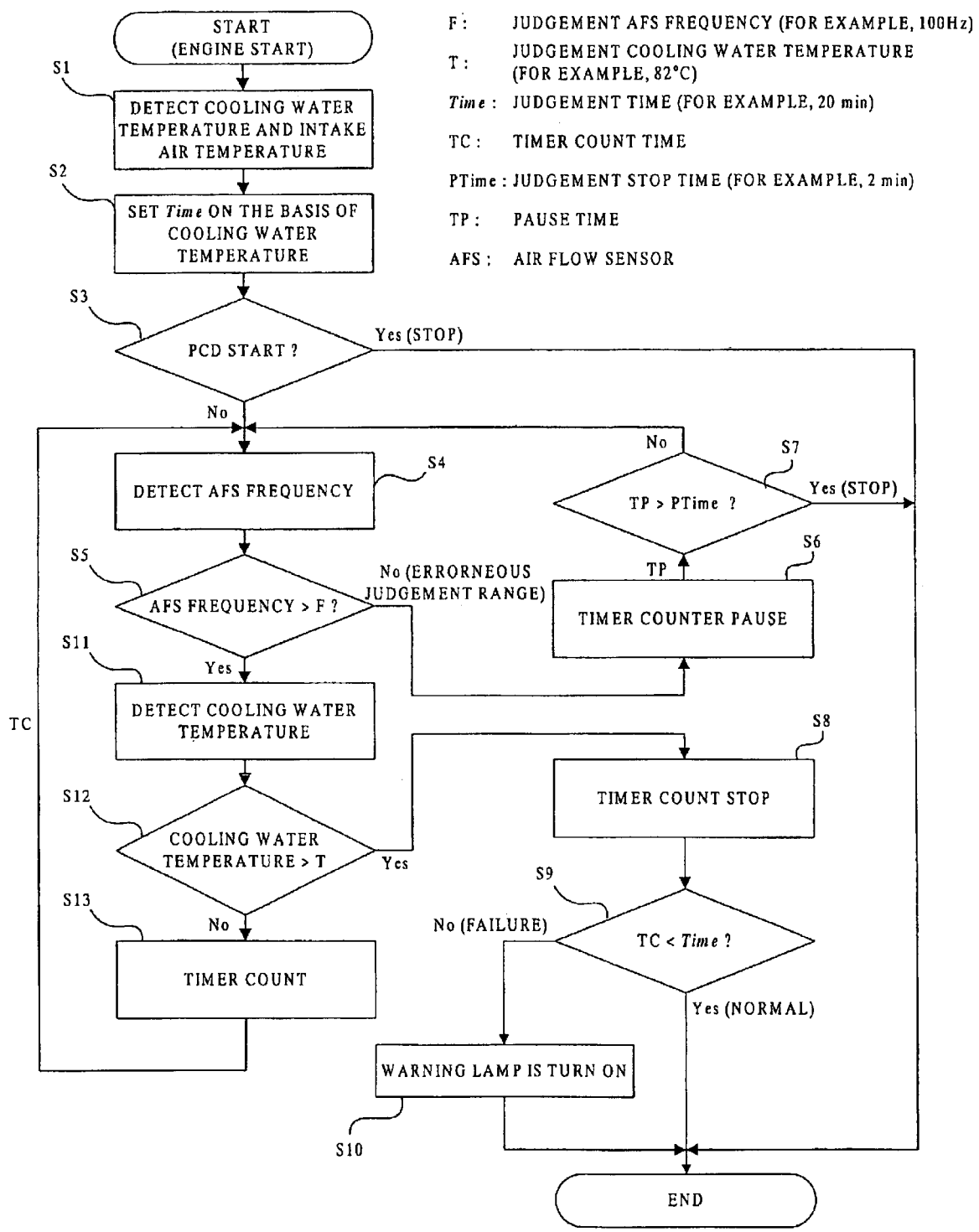
FIG. 4 is a flowchart showing the contents of a thermostat failure diagnosis apparatus for an internal combustion engine according to a second embodiment of the invention.

FIG. 4 shows a second embodiment of the invention.

This embodiment is a modified example of the first embodiment, and its flowchart is different in that step S11, step S12, and step S13 are continued after step 5, and step S11, where timer count is stopped when a cooling water temperature reaches a judgment cooling water temperature T (predetermined temperature), is added to step S12, and then, a judgment process of step S9 is performed. In this embodiment, on the basis of a time in which the cooling water temperature rises to the judgment cooling water temperature T (predetermined temperature), a diagnosis of whether the thermostat 22 has broken is made.

Even when such modification is made, the same effect as the first embodiment can be obtained. Here, in the flowchart shown in FIG. 4, the same characters are given to the same portions as the flowchart shown in FIG. 3, and their description is omitted.

Incidentally, in both the first and second embodiments, although the failure diagnosis of the thermostat is made by using the intake air quantity of the engine and the parameter value related to the intake air quantity, the invention is not limited to this, but by using a parameter value related to a fuel injection quantity calculated by the ECU 23, similarly to the first and second embodiments, failure of the thermostat may be detected on the basis of a time in which a rising quantity in the cooling water temperature reaches a predetermined value or a time in which the cooling water temperature rises to a predetermined temperature, when the parameter value is equal to or higher than a predetermined value.

As described above, according to the present invention, since a failure diagnosis of a thermostat is made only in the state where the quantity of heat generated in an internal combustion engine is large to some degree, an erroneous diagnosis can be prevented. Moreover, since a region where the failure diagnosis is made can be set in a region where a cooling water temperature is easily raised, based on an intake air quantity or a fuel injection quantity indicating considerably high correlation with output of the internal combustion engine, the failure diagnosis can be effectively made, and the failure diagnosis having a less diagnosis time and high efficiency can be made.

What is claimed:

1. A thermostat failure diagnosis apparatus for an internal combustion engine, which diagnoses a failure of a thermostat provided in a cooling water passage of the internal combustion engine, comprising:

cooling water temperature detection means for detecting a cooling water temperature of an internal combustion engine at an upstream side of the thermostat;

detection means for detecting one of an actual fuel injection quantity of the internal combustion engine and a parameter indicative of the actual fuel injection quantity;

diagnosis means for detecting, only when one of the detected actual fuel injection quantity and the detected parameter is equal to or higher than a first predetermined value, the failure of the thermostat on the basis of at least one of a time in which an increasing amount of the cooling water temperature reaches a second predetermined value and a time in which the cooling water temperature rises to a third predetermined temperature, after starting of the internal combustion engine; and a timer that counts a period of time where said one of the detected actual fuel injection quantity and the detected parameter is lower than the first predetermined value, such that the failure of the thermostat detection is terminated when the counted period of time exceeds a fourth predetermined value.

2. A thermostat failure diagnosis apparatus according to claim 1, further comprising:

outside air temperature detection means for detecting an outside air temperature or a parameter indicative of the outside air temperature, wherein the diagnosis means permits failure diagnosis when, after starting of the engine, the detected cooling water temperature becomes equal to or higher than the detected outside temperature.

3. A thermostat failure diagnosis apparatus according to claim 1, wherein the diagnosis means detects failure of the thermostat by comparing a predetermined time with one of the time in which the rising quantity in the cooling water temperature reaches the second predetermined value and the time in which the cooling water temperature rises to the third predetermined value, and the predetermined time is set based on the detected cooling water temperature.

4. A thermostat failure diagnosis apparatus for an internal combustion engine, which diagnoses a failure of a thermostat provided in a cooling water passage of the internal combustion engine, comprising:

cooling water temperature detection means for detecting a cooling water temperature of the internal combustion engine at an upstream side of the thermostat;

parameter detection means for detecting a control parameter of the internal combustion engine;

diagnosis means for detecting the failure of the thermostat on the basis of at least one of a time in which an increasing amount of the cooling water temperature reaches a first predetermined value and a time in which the cooling water temperature rises to a second predetermined temperature, in a case where a control parameter value detected by the parameter detection means is equal to or higher than a third predetermined value after starting of the internal combustion engine; and a timer that counts a period of time where said detected parameter is lower than the third predetermined value, such that failure of the thermostat detection is terminated when the counted period of time exceeds a fourth predetermined value.

5. A thermostat failure diagnosis apparatus according to claim 4, wherein the parameter detection means includes detection means for detecting one of an actual intake air quantity of the internal, combustion engine and a parameter indicative of the actual intake air quantity.

6. A thermostat failure diagnosis apparatus according to claim 4, wherein the parameter detection means includes detection means for detecting one of an actual fuel injection quantity of the internal combustion engine and a parameter indicative of the actual fuel injection quantity.

* * * * *